United States Patent
McCoog et al.

(10) Patent No.: US 8,860,992 B2
(45) Date of Patent: Oct. 14, 2014

(54) CELLULAR TELEPHONE PROTOCOL ADAPTIVE PRINTING

(75) Inventors: Phillip A. McCoog, Portland, OR (US);
Leo Robert Blume, Palo Alto, CA (US);
Rabindra Pathak, Vancouver, WA (US);
Michael Strittmatter, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 9 days.

(21) Appl. No.: 13/524,673

(22) Filed: Jun. 15, 2012

(65) Prior Publication Data

US 2012/0314254 A1   Dec. 13, 2012

Related U.S. Application Data

(62) Division of application No. 10/463,383, filed on Jun. 16, 2003, now Pat. No. 8,223,355.

(51) Int. Cl.
*H04B 7/00* (2006.01)
*H04M 1/725* (2006.01)

(52) U.S. Cl.
CPC ........ *H04M 1/7253* (2013.01); *H04M 2250/02* (2013.01); *H04M 1/72547* (2013.01)
USPC ........................................ 358/1.15; 455/41.3

(58) Field of Classification Search
CPC .................................................... H04M 1/7253
See application file for complete search history.

(56) References Cited

U.S. PATENT DOCUMENTS

| | | |
|---|---|---|
| 6,330,051 B1 | 12/2001 | Takanashi |
| 6,553,240 B1 | 4/2003 | Dervarics |
| 6,621,590 B1 | 9/2003 | Livingston |
| 6,634,559 B2 | 10/2003 | Shioda et al. |
| 7,020,838 B2 | 3/2006 | Tsykora |
| 7,047,313 B1 | 5/2006 | Broerman |
| 2002/0051184 A1 | 5/2002 | Fritz et al. |
| 2002/0080395 A1 | 6/2002 | Kurashina |
| 2002/0105669 A1 | 8/2002 | Watanabe et al. |
| 2002/0113994 A1 | 8/2002 | Smith, II et al. |
| 2002/0138564 A1 | 9/2002 | Treptow et al. |
| 2002/0171857 A1 | 11/2002 | Hisatomi et al. |
| 2003/0002072 A1 | 1/2003 | Berkema et al. |

(Continued)

FOREIGN PATENT DOCUMENTS

| | | |
|---|---|---|
| EP | 1271889 A2 | 1/2003 |
| JP | 6338962 A | 12/1994 |

(Continued)

OTHER PUBLICATIONS

European Patent Office, Office Action from corresponding European application No. 04 253 472.7-1246, issued Aug. 24, 2007, pp. 1-4.

(Continued)

*Primary Examiner* — Saeid Ebrahimi Dehkordy
*Assistant Examiner* — Lennin Rodriguezgonzale

(57) ABSTRACT

A cellular telephone protocol adaptive printing system includes a mobile device protocol logic configured to transmit a print job from a cellular telephone to an image forming device, pursuant to a print data transmission protocol; and a content transforming logic configured to process a print item into the print job pursuant to the print data transmission protocol supported by the mobile device protocol logic.

20 Claims, 12 Drawing Sheets

(56) References Cited

U.S. PATENT DOCUMENTS

| | | |
|---|---|---|
| 2003/0002073 A1 | 1/2003 | Berkema et al. |
| 2003/0005050 A1 | 1/2003 | Pineau et al. |
| 2003/0035133 A1 | 2/2003 | Berkema et al. |
| 2003/0078965 A1 | 4/2003 | Cocotis et al. |
| 2003/0095524 A1 | 5/2003 | Stephens et al. |
| 2003/0137692 A1* | 7/2003 | Kato et al. ............ 358/1.15 |
| 2003/0144910 A1 | 7/2003 | Flaherty et al. |
| 2003/0174346 A1 | 9/2003 | Nagatani |
| 2004/0066530 A1 | 4/2004 | Wu et al. |
| 2004/0085288 A1 | 5/2004 | Adams et al. |
| 2004/0085573 A1 | 5/2004 | Aidinejad |
| 2004/0117459 A1 | 6/2004 | Fry |
| 2004/0169880 A1 | 9/2004 | Nakanishi et al. |
| 2004/0172594 A1 | 9/2004 | Jones et al. |
| 2004/0190043 A1 | 9/2004 | Beckman et al. |
| 2004/0205512 A1 | 10/2004 | Hoover et al. |
| 2004/0239980 A1 | 12/2004 | Watts |

FOREIGN PATENT DOCUMENTS

| | | | |
|---|---|---|---|
| JP | 2001175432 A | | 6/2001 |
| JP | 2002084348 | | 3/2002 |
| JP | 2002169671 A | | 6/2002 |
| JP | 2002312143 A | | 10/2002 |
| JP | 2003015846 | | 1/2003 |
| JP | 2003143520 A | | 5/2003 |
| WO | 9935818 A2 | | 7/1999 |
| WO | WO03008196 | * | 1/2003 |

OTHER PUBLICATIONS

Japan Office Action dated May 30, 2006, 1 page.
European Search Report for Patent Application No. EP04253472 (Sep. 23, 2004).
Oak Technology, "XPI Embedded XHTML-Printer Interpreter", (http://www.oaktech.com/products/imaging/software/ips/xhtml.html), 2003.

* cited by examiner

CELLULAR TELEPHONE PROTOCOL ADAPTIVE PRINTING

CROSS-REFERENCE TO RELATED APPLICATIONS

This application is a Divisional of U.S. patent application Ser. No. 10/463,383, filed on Jun. 16, 2003 now U.S. Pat. No. 8,223,355, which is incorporated herein by reference.

TECHNICAL FIELD

The systems, methods, storage media, and so on described herein relate generally to cellular telephones and more particularly to cellular telephone protocol adaptive printing.

BACKGROUND

Cellular telephones have conventionally had limited or no print protocol awareness.

BRIEF DESCRIPTION OF THE DRAWINGS

The accompanying drawings, which are incorporated in and constitute a part of the specification, illustrate various example systems, methods, and so on that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
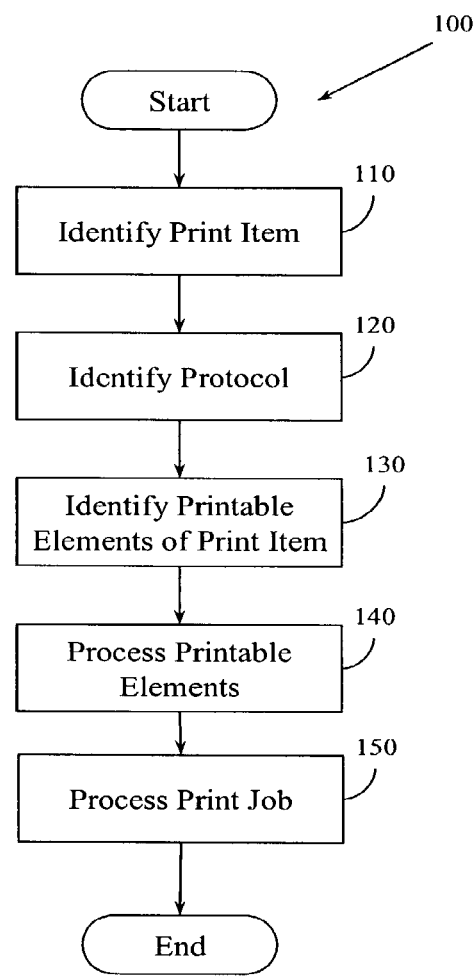
FIG. 1 illustrates an example cellular telephone protocol adaptive printing method.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a storage medium that participates in directly or indirectly providing instructions and/or data. A computer-readable medium may take forms, including, but not limited to, non-volatile media, and volatile media. Volatile media may include dynamic memory and the like. Common forms of a computer-readable medium include, for example, a floppy disk, a flexible disk, a hard disk, a magnetic tape, other magnetic medium, a CD-ROM, other optical medium, other physical medium with patterns of holes, a RAM, a ROM, an EPROM, a FLASH-EPROM, or other memory chip or card, a memory stick, and other media from which a computer, a processor or other electronic device can read.

"Logic", as used herein, includes but is not limited to hardware, firmware, software and/or combinations of each to perform a function(s) or an action(s), and/or to cause a function or action from another component. For example, based on a desired application or needs, logic may include a software controlled microprocessor, discrete logic like an application specific integrated circuit (ASIC), a programmed logic device, a memory device containing instructions, or the like. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

"Signal", as used herein, includes but is not limited to one or more electrical or optical signals, analog or digital, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

"User", as used herein, includes but is not limited to one or more persons, software, computers, logics, or other devices, or combinations of these.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

An "operable connection", or a connection by which entities are "operably connected", is one in which signals, physical communication flow, and/or logical communication flow may be sent and/or received. Typically, an operable connection includes a physical interface, an electrical interface, and/or a data interface, but it is to be noted that an operable connection may include differing combinations of these or other types of connections sufficient to allow operable control.

A "print data transmission protocol", as used herein, refers to a transmission protocol that a cellular telephone may use to transmit a print job to an image forming device (e.g., a printer). An example protocol is Bluetooth.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. Unless specifically stated otherwise, it is appreciated that throughout the description, terms like processing, computing, calculating, determining, displaying, or the like, refer to actions and processes of a computer system, logic, processor, or similar electronic device that manipulates and transforms data represented as physical (electronic) quantities.

Example methods may be better appreciated with reference to the flow diagrams of FIGS. 1 through 5. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Furthermore, additional and/or alternative methodologies can employ additional, not illustrated blocks.

In one example, methodologies are implemented as processor executable instructions and/or operations stored on a computer-readable medium including, but not limited to, an application specific integrated circuit (ASIC), a compact disc (CD), a digital versatile disk (DVD), a random access memory (RAM), a read only memory (ROM), a programmable read only memory (PROM), an electronically erasable programmable read only memory (EEPROM), a disk, a carrier wave, and a memory stick.

In the flow diagrams, blocks denote "processing blocks" that may be implemented, for example, in software. Additionally and/or alternatively, the processing blocks may represent functions and/or actions performed by functionally equivalent circuits like a digital signal processor (DSP), an application specific integrated circuit (ASIC), and the like.

A flow diagram does not depict syntax for any particular programming language, methodology, or style (e.g., procedural, object-oriented). Rather, a flow diagram illustrates functional information one skilled in the art may employ to fabricate circuits, generate software, or use a combination of hardware and software to perform the illustrated processing. It will be appreciated that in some examples, program elements like temporary variables, routine loops, and so on are not shown. It will be further appreciated that electronic and software applications may involve dynamic and flexible processes so that the illustrated blocks can be performed in other sequences that are different from those shown and/or that blocks may be combined or separated into multiple components. It will be appreciated that the processes may be implemented using various programming approaches like machine language, procedural, object oriented and/or artificial intelligence techniques.

FIG. 1 illustrates an example cellular telephone protocol adaptive print method 100. The method 100 may include, at 110, identifying a cellular telephone print item to print, where the cellular telephone print item includes one or more printable elements. The cellular telephone may be, for example, a camera-enabled mobile phone or a Personal digital assistant (PDA) with cellular phone capabilities. The cellular telephone print item may be, for example, a multimedia message service (MMS) message, a short message service (SMS) message, an email, an image, a file, an object, a contact, a calendar item, and the like. Conventionally, if available at all, the printing performed by a cellular telephone of a print item like an MMS message has been limited to the text in the message or a single image in the message, but not both. This limited conventional printing, when implemented, has been performed, for example, via a simple object push (e.g., OBEX push over Bluetooth). But a user may desire more than a simple image dump or a text object push.

By way of illustration, MMS concerns a store and forward method for transmitting related items like graphics, video clips, sound files, short text messages and the like via wireless networks. Since an MMS message may contain different combinations of these items, a user may want to print various combinations of these items. However, some items (e.g., sound files) may not be printable, other items (e.g., graphics interchange format (GIF) files) may not be printable on an image forming device with which a cellular telephone communicates via a certain print data transmission protocol, while other items (e.g., text, JPEG (joint photographic experts group) format files) may be printable. Thus, the cellular telephone protocol adaptive print method 100 includes, at 120, identifying a print data transmission protocol by which a print job can be transmitted from a cellular telephone to an image forming device via a wireless communication link. Identifying the print data transmission protocol by which a print job can be transmitted to an image forming device facilitates determining which, if any, elements of a message like an MMS message may be printed by an image forming device that implements, for example, a receiver end of the print data transmission protocol.

MMS may be implemented over a wireless application protocol (WAP). WAP defines a secure specification that facilitates users accessing, substantially instantaneously, via their cellular telephones, MMS messages. The cellular telephones can include, but are not limited to, mobile phones, pagers, two way radios, smart phones, communication systems, and the like. WAP implementations can support wireless network technologies like cellular digital packet data (CDPD) networking, code division multiple access (CDMA) processing, global system for mobile communication (GSM) networking, time division multiple access (TDMA), and so on. WAP may be supported by operating systems including those engineered for handheld devices. Thus, the environment in which the cellular telephone operates may be varied, with differing print capabilities depending on the protocol(s) implemented between various cellular telephones and various image forming devices. Furthermore, the types of messages received, and the mix of print item elements encountered in those various messages may be varied. Thus, identifying the print data transmission protocol at 120 facilitates broadening and/or enriching the print experience of a user by making it more responsive to the varied environment and varied messages that can be encountered by the cellular telephone user.

At 120, identifying a print data transmission protocol may involve actions including, but not limited to, examining a logic on a cellular telephone to identify a supported cellular telephone transmission protocol, examining an image forming device with which the cellular telephone can communicate to determine an available image forming device that can print the print job, identifying an available wireless communication link between the cellular telephone and the image forming device with which the cellular telephone can communicate, and determining a cellular telephone transmission protocol(s) that can be employed to transmit a print job over the available wireless communication link(s) to the image forming device(s) with which the cellular telephone can communicate.

By way of illustration, in an MMS message, the presentation of the message may be coded into a message presentation file so that images, sounds, text and so on are displayed in a pre-determined order as one singular message. For printing, the presentation may need to be altered since certain types of content may not be printable for one or more reasons. For example, a wireless request to print an MMS message including a sound file or a certain graphic file may not be receivable or printable by a certain image forming device using the print data transmission protocol. Thus, broadening and/or enriching the print experience is facilitated by method 100 which may include, at 130, identifying, from printable elements in a print item, print job candidate elements that can be processed into a printer-ready format according to the print data transmission protocol. In other words, the capabilities of the print data transmission protocol can be used to determine which printable elements are printable and/or determine which printable elements are not printable so that time and resources can be optimized by not trying to print unprintable content.

For example, an MMS message may include a text portion, two graphics portions (a GIF portion, a JPEG portion) and an audio file. At 130, the method 100 may identify that the audio file is not printable. The method 100 may also identify, by referring to the print data transmission protocol identified at 120, that the JPEG graphic portion is printable on the image forming device with which the wireless mobile communication device will communicate via the print data transmission protocol while the GIF portion is not. The method 100 may also identify that the text portion is printable. Thus, the various printable elements of a print item can be identified as print job candidate elements by the method 100, and a user and/or logic can determine which, if any, of the print job candidate elements are to be processed into a print job element for transmission to an image forming device. While the print job candidate elements to process can be selected through a user interface or programmatically, the print job candidate elements that are processed into print job elements may also be filtered out of the set of printable elements. For example, a pre-determined, configurable filter that identifies desired printable elements based on attributes like type, size, time stamp, owner, originator, and so on may be employed to select the print job candidate elements that are to be processed.

At 140, after identifying the printable elements of the print item as print job candidate elements (e.g., the text and JPEG sections of an MMS message), the method 100 may include selectively processing a print job candidate element into a print job element formatted according to the print data transmission protocol. The method 100 also may include, at 150, processing the one or more print job elements into a print job. In one example, method 100 may also include transmitting the print job to the image-forming device. In another example, the print data transmission protocol is based on a Bluetooth wireless network, a Bluetooth basic print profile (BPP) and a markup language like XHTML (extensible hypertext markup language).

Figure 2:
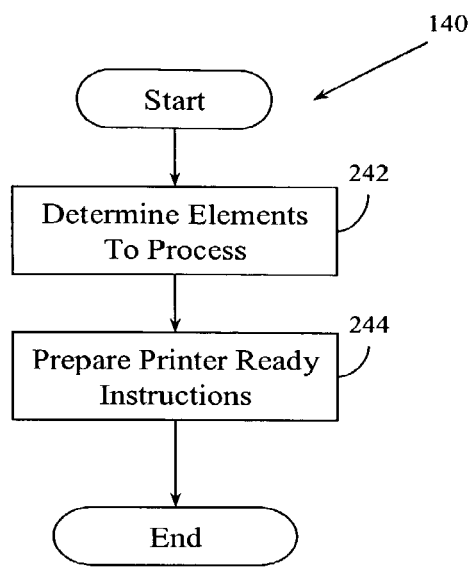
FIG. 2 illustrates an example cellular telephone protocol adaptive printing method.

Turning now to FIG. 2, an example implementation of block 140 from FIG. 1 is illustrated. In one example, at 242, print job candidate elements to process are identified. Then, at 244, printer-ready instructions are prepared. For example, in the MMS message described above, the printable text portion and the printable JPEG portion may be wrapped with printer-ready instructions and/or reformatted and then mixed with printer-ready instructions.

It is to be appreciated that a cellular telephone print item may be identified in different manners. Thus, in one example, a cellular telephone adaptive protocol print method includes, presenting, via a user interface, one or more candidate cellular telephone print items to be processed and receiving, via the user interface, an indication that identifies one or more cellular telephone print items to process. By way of illustration, a cellular telephone user may have received a set of MMS messages, a set of SMS messages, and a set of emails. If the cellular telephone is camera-enabled, the user may also have acquired a set of images, still and/or video. Furthermore, the cellular telephone may have come pre-configured with a set of items (e.g., images, text, audio). Thus, the user may have a varied set of items, some of which may be printable in whole or in part. Thus, a cellular telephone protocol adaptive printing method can examine the varied set of items and display to the user, via the user interface, which items are printable and, in one example, which of the elements in a print item are printable. For example, an MMS message may be presented as being printable, with the printable portions and non-printable portions of the MMS message identified by, for example, visual distinctions.

Figure 3:
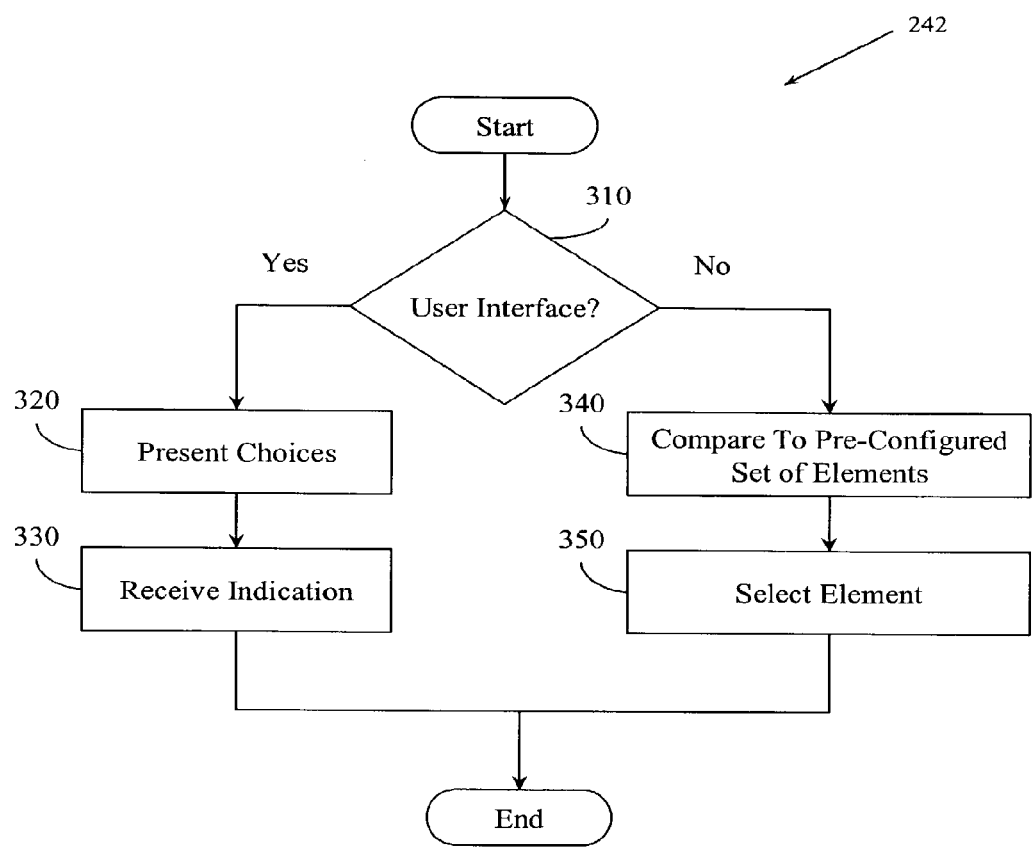
FIG. 3 illustrates an example cellular telephone protocol adaptive printing method.

FIG. 3 illustrates a portion 242 of an example cellular telephone protocol adaptive print method. At 310, a determination is made concerning whether the decision about which print job candidate elements are to be processed will involve a user interaction via a user interface. If the determination at 310 is Yes, then at 320 print job candidate elements are presented to the user and at 330 an indication is received concerning which print job candidate elements the user desires to have processed into a print job.

If the determination at 310 is No, then at 340 the print job candidate elements are compared to a pre-configured set of elements that can include, but is not limited to, a file extension, a candidate element file content, a candidate element file type, a candidate element file format, a candidate element object type, a candidate element message type, a candidate element encoding, a candidate element content, and a candidate element format to a set of one or more types, extensions, contents, and formats supported by the print data transmission protocol. Based on the comparison at 340, a print job candidate element(s) is chosen to be processed at 350. Thus, in one example, the portion 242 includes determining which print job candidate elements are to be processed based, at least in part, on a content type supported by the print data transmission protocol. In another example, the portion 242 includes comparing one or more print job candidate elements to a preconfigured set of element types chosen to be printed and, based on the comparison, selecting one or more print job candidate elements to process. Thus, print job candidate elements to process into print job elements can be filtered out of the set of available print job candidate elements. For example, a pre-determined, configurable filter that identifies desired printable elements based on attributes like type, size, time stamp, owner, originator, and so on may be employed to select the printable elements that are to be processed.

Figure 4:
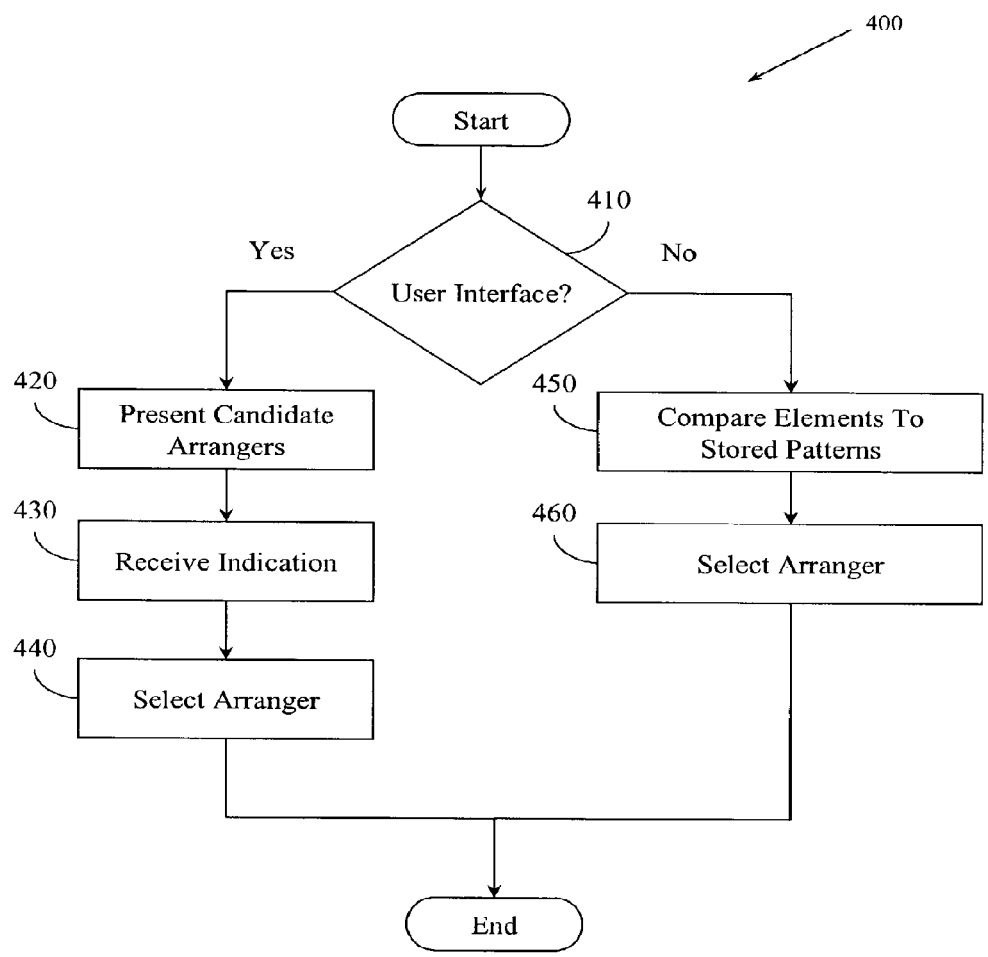
FIG. 4 illustrates an example cellular telephone protocol adaptive printing method.

FIG. 4 illustrates a portion 400 of a wireless protocol adaptive printing method that concerns processing print job elements into a print job according to a print data transmission protocol and an information dense content arranger layout. Thus, in one example, processing print job elements into a print job includes selecting a configurable information dense content arranger into which the print job elements can be arranged and arranging the print job elements in the configurable information dense content arranger. In one example, the information dense content arranger is designed to interact with the print data transmission protocol. In another example, the configurable information dense content arranger is an XHTML template. In yet another example, the configurable information dense content arranger is an XHTML-Print template. It is to be appreciated that references to XHTML are intended to include versions of XHTML like XHTML-Print.

At 410, a determination is made concerning whether the decision about which content arranger, if any, will be employed in processing the print job elements into a print job will involve the user via a user interface. If the determination at 410 is Yes, then the portion 400 may include, at 420, presenting to a user, via a user interface, candidate arrangers and, at 430, receiving, via the user interface, an indication that identifies the arranger into which the print job element(s) is to be arranged. Thus, at 440, an arranger can be selected based on the indication received at 430 from the user via the user interface.

If the determination at 410 is No, then the portion 400 may include, at 450, comparing the print job elements to a set of stored print job element patterns, and, at 460 selecting the arranger based on the comparing of 450. By way of illustration, the set of stored print job elements may include various content layouts designed for various amounts and/or mixes of content in a print job. For example, a first print job that has several small images each captioned with a short text message may lead to selecting an arranger that facilitates viewing multiple images and the associated text on a single page. A second print job that has one large image and a large amount of text to flow around the image may lead to selecting an arranger that facilitates centering the image on a printed page and having the text flow around the image in a pleasing way. A third print job that has several large images that are time stamped may lead to selecting an arranger that facilitates displaying each large image on a separate page with its associated text time stamp. The third print job may benefit from, for example, a first page treatment, a last page treatment, and a header/footer being attached. Thus, in one example, the arranger facilitates producing these effects. Additionally, other arrangers may facilitate implementing print functionalities including, but not limited to, positioning text and/or images, centering text and/or images, rotating text and/or images, scaling text and/or images, and combining multiple images and/or texts on a printed page. Furthermore, other arrangers may facilitate implementing print functionality to account for multiple page prints. For example, multiple page printing may involve automatically handling white space, arranging content into rows and/or columns, numbering pages, generating intelligent page breaks that enhance readability, and the like. Once again, arranger selection can enhance the print experience when the arranger is chosen in light of the print data transmission protocol. Thus, in one example, an XHTML template may be selected based on its functionality when transmitted over a Bluetooth wireless network using Bluetooth BPP. Thus, printable elements from an MMS message may be processed into a print job that is arranged according to the layout in an XHTML template, and then the template is transmitted to an image forming device via a Bluetooth wireless network using Bluetooth BPP.

Figure 5:
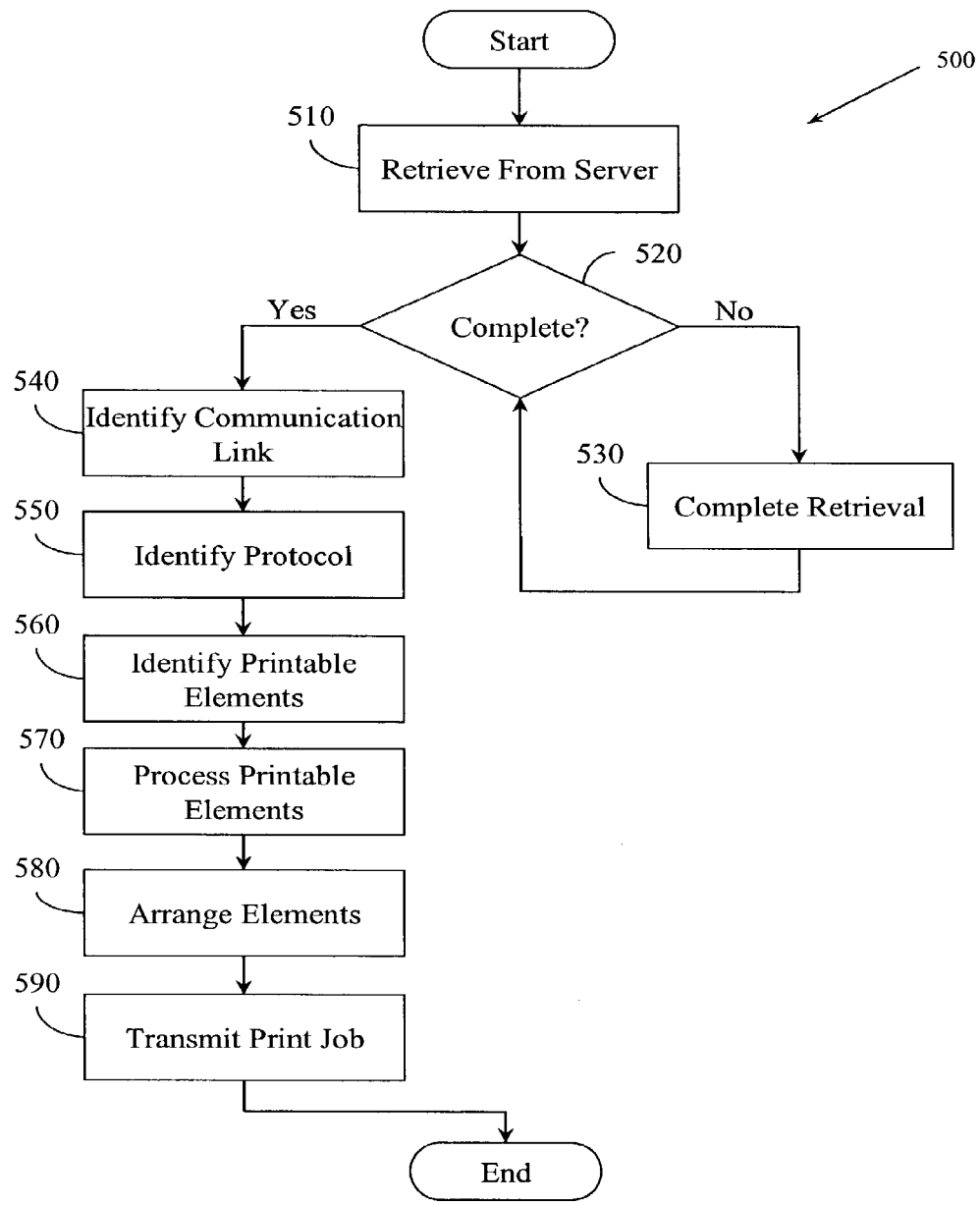
FIG. 5 illustrates an example cellular telephone protocol adaptive printing method.

FIG. 5 illustrates a wireless protocol adaptive printing method 500. The method 500 may include, at 510, retrieving a cellular telephone print item from a server. The server types from which the cellular telephone print item can be retrieved include, but are not limited to, an MMS server, an SMS server, a contact server, a calendar server, a message server, an image server, a text server, and a game server. At 520, a determination is made concerning whether the cellular telephone print item is a complete message. If the determination at 520 is No, that the cellular telephone print item is not a complete message, then the method 500 may include, at 530, communicating with a server to retrieve additional data until the cellular telephone print item is a complete message. Completing the retrieval at 530 may involve communicating with one or more servers. For example, a message header may have been retrieved at 510 and the message header may indicate that text associated with the message header is available at a text server while images associated with the message header are available at an image server. Thus, completing the retrieval at 530 may include communicating with the text server for the text and the image server for the images.

Once a complete message is retrieved, the method 500 may also include, at 540, identifying a communication link by which a cellular telephone can communicate with an image forming device and, at 550, identifying a protocol by which print items can be transmitted. For example, the communication link may be a wireless link supported by WAP and the print data transmission protocol may be based on a Bluetooth wireless network and Bluetooth BPP.

The method 500 may also include, at 560, identifying printable elements in the complete retrieved cellular telephone print item and, at 570, selectively processing chosen printable elements into print job elements. The method 500 may then include, at 580 selecting an arranger to guide the layout of the print job elements and arranging the print job elements into a print job. In one example the arranger is an XHTML template and the print job elements are merged into the XHTML document along with printer-ready instructions concerning the print job elements. At 590, the print job is transmitted, via the wireless communication link, using the print data transmission protocol to an image forming device. It is to be appreciated that processor executable instructions for portions and/or all of method 500 may be stored on a computer-readable medium.

In one example, a computer-readable medium may store processor executable instructions operable to perform a method that includes, retrieving a cellular telephone print item from an MMS server and selectively retrieving additional data from the MMS server to make a complete cellular telephone print item that includes printable elements. The method may also include identifying a wireless communication link by which a print job can be transmitted from a camera-enabled mobile phone to a printer via a Bluetooth wireless network and Bluetooth BPP and filtering out of the printable elements print job elements to process into a printer-ready format, where the identifying depends, at least in part, on content types supported by a Bluetooth wireless network and Bluetooth BPP. The method may also include processing the print job elements into a print job, where the processing includes generating one or more printer-ready instructions and arranging the print job elements and the printer-ready instructions in an XHTML template. The method may also include transmitting the XHTML template to the printer using the wireless communication link, a Bluetooth wireless network, and Bluetooth BPP.

Figure 6:
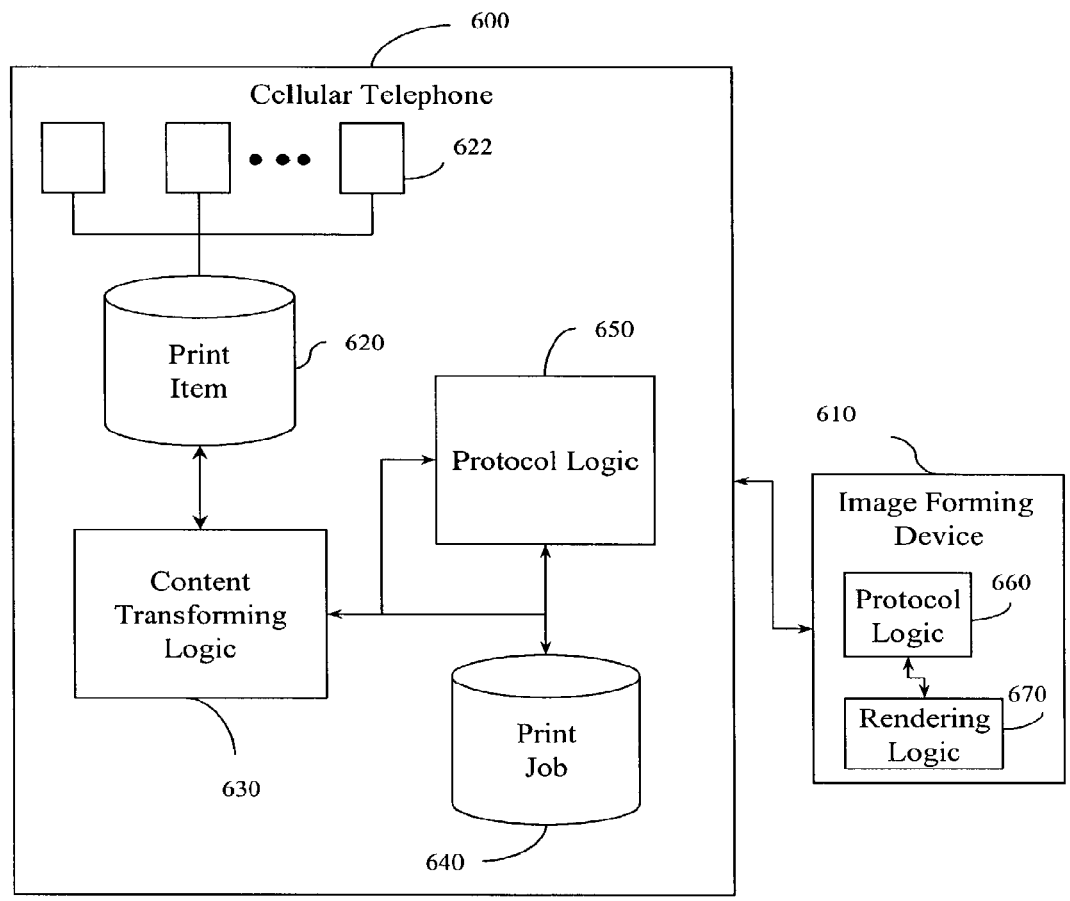
FIG. 6 illustrates an example cellular telephone protocol adaptive printing system.

FIG. 6 illustrates an example cellular telephone 600 configured with a wireless protocol adaptive printing system. The cellular telephone 600 may communicate with an image forming device 610 over a wireless network using, for example, Bluetooth protocols, and/or IEEE 802.11 protocols. Bluetooth refers to short-range radio technology concerned with data and/or computer communications. Information concerning the Bluetooth specification and protocols can be found, for example, at www.bluetooth.org. IEEE 802.11 refers to a family of specifications developed by the Institute of Electrical and Electronics Engineers (IEEE) for wireless local area network (LAN) technology.

The image forming device 610 may be, for example, a printer. The cellular telephone 600 may be, for example, a camera-enabled mobile phone. The cellular telephone 600 may have available a print item 620 to be processed by the print system. The print item 620 may be associated with a message received from a server. Servers with which the message may be associated include, but are not limited to, an MMS server, an SMS server, an image server, a text server, an audio server, and so on. Thus, the print item 620 may include various parts 622. Some of the parts 622 may be printable (e.g., text, JPEG file) on the image forming device 610 when communicated via a print data transmission protocol. In one example, the print item 620 may be an MMS message.

The cellular telephone protocol adaptive print system may include a content transforming logic 630 configured to process the print item 620 into a print job 640 pursuant to a print data transmission protocol supported by a mobile device protocol logic 650. The protocol logic 650 may be configured, for example, to transmit a print job 640 from a cellular telephone 600 to an image forming device 610 pursuant to a print data transmission protocol. Thus, the protocol logic 650 can be said to support a print data transmission protocol. In one example, the print data transmission protocol is based on a Bluetooth wireless network and Bluetooth BPP.

In one example, the cellular telephone protocol adaptive print system may be incorporated in a wireless communication device 600. The cellular telephone 600 may be, for example, a camera-enabled mobile phone.

The image forming device 610 may include a receiving protocol logic 660 configured to receive a print job 640 processed by the mobile device protocol logic 650. Additionally, the image forming device 610 may include a rendering logic 670 configured to process the print job received by the receiving protocol logic 660 into a printer-usable format. The rendering logic 670 may be configured, for example, to render the print job received by the receiving protocol logic 660 into a bitmap.

Printer-ready formats can include forms like printer-ready bits, printer-ready instructions, printer-independent data and instructions and so on. In one example, the system provides the print job 640 in the form of "printer-ready bits" (e.g., a rendered image, a bitmap), while in another example, the system provides the print job 640 in the form of "printer-ready instructions" (e.g., PostScript instructions, XHTML instructions). Printer-ready bits may include, for example, data rendered into a format acceptable to a printer where the printer can print the data without further rendering. Printer-ready instructions may include, for example, data prepared and packaged into a file that is in a format acceptable to a printer where the printer can print the data by processing the instructions included with the data. Thus printer-ready bits and printer-ready instructions refer to an item that has a data representation acceptable to and/or usable by a printer. In another example, the system provides the print job 640 in a printer-independent yet still printer-ready format. For example, data like vCard and/or vCal data may be provided. In yet another example, the system provides the print job 640 in a format suitable for display on a device like a computer monitor or television screen rather than on a printer. Thus, it is to be appreciated that the print job 640 is not limited to printer-ready data destined for a printer and that the image forming device may take various forms (e.g., printer, display).

Figure 7:
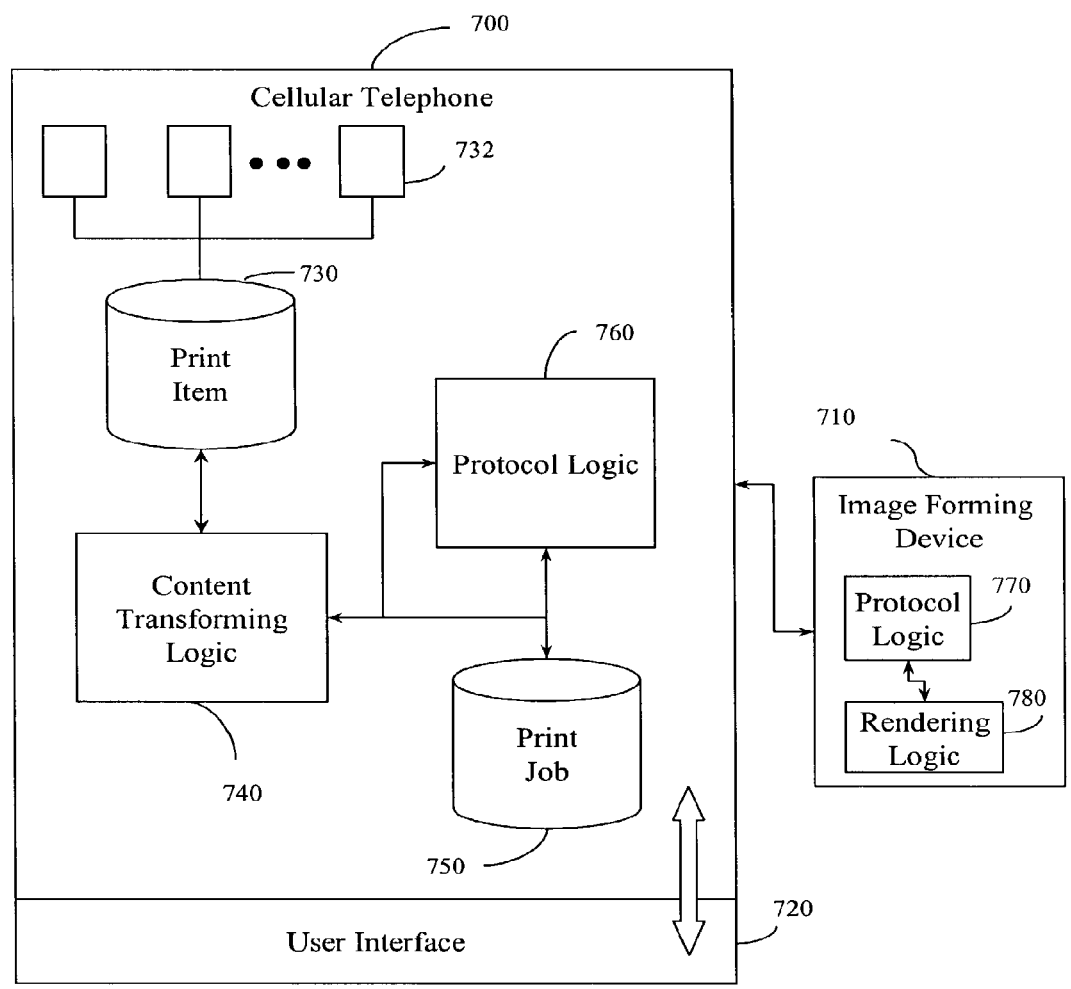
FIG. 7 illustrates an example cellular telephone protocol adaptive printing system.

FIG. 7 illustrates a cellular telephone 700 that can communicate with an image forming device 710 comprising a protocol logic 770 and a rendering logic 780, where the cellular telephone 700 is configured with a user interface logic 720. The user interface logic 720 may be configured to present information related to parameters associated with items including, but not limited to, a print item 730, a print item element 732, a content transforming logic 740, a print job 750, and a mobile device protocol logic 760. Additionally, the user interface logic 720 may be configured to receive, for example, an indication and/or a value associated with the parameters associated with the print item 730, the content transforming logic 740, the print job 750, and the mobile device protocol logic 760.

The user interface logic 720 thus facilitates configuring and/or controlling the print system on the cellular telephone 700. By way of illustration, although the cellular telephone 700 may receive a variety of print items 730, a user may only be interested in printing certain print items. Thus, the user interface logic 720 may be employed to configure the content transforming logic 740 to consider a set of print items 730 for printing while rejecting others. Similarly, a print item 730 may have a variety of printable and non-printable elements 732. Thus, the user interface logic 720 can be employed to configure the content transforming logic 740 to consider some elements 732 of a print item 730 as printable while considering other elements 732 not to be printable. Furthermore, a print job 750 may be able to be laid out according to a variety of arrangements. Thus, the user interface logic 720 can be employed to design, modify, maintain, select, and so on different possible templates, arrangements, and so on for a print job 750. The user interface logic 720 can also be configured to facilitate managing parameters associated with filtering. For example, print items to process can be filtered out of a set of available print items based on their relationship to one or more pre-determined, configurable filtering parameters. So too can print item elements to be processed by filtered from available print item elements based on their relationship to one or more pre-determined, configurable filtering parameters. Likewise, content arrangers to suggest to a user can be filtered out of the entire set of available content arrangers based on conformity with one or more pre-determined, configurable parameters.

Figure 8:
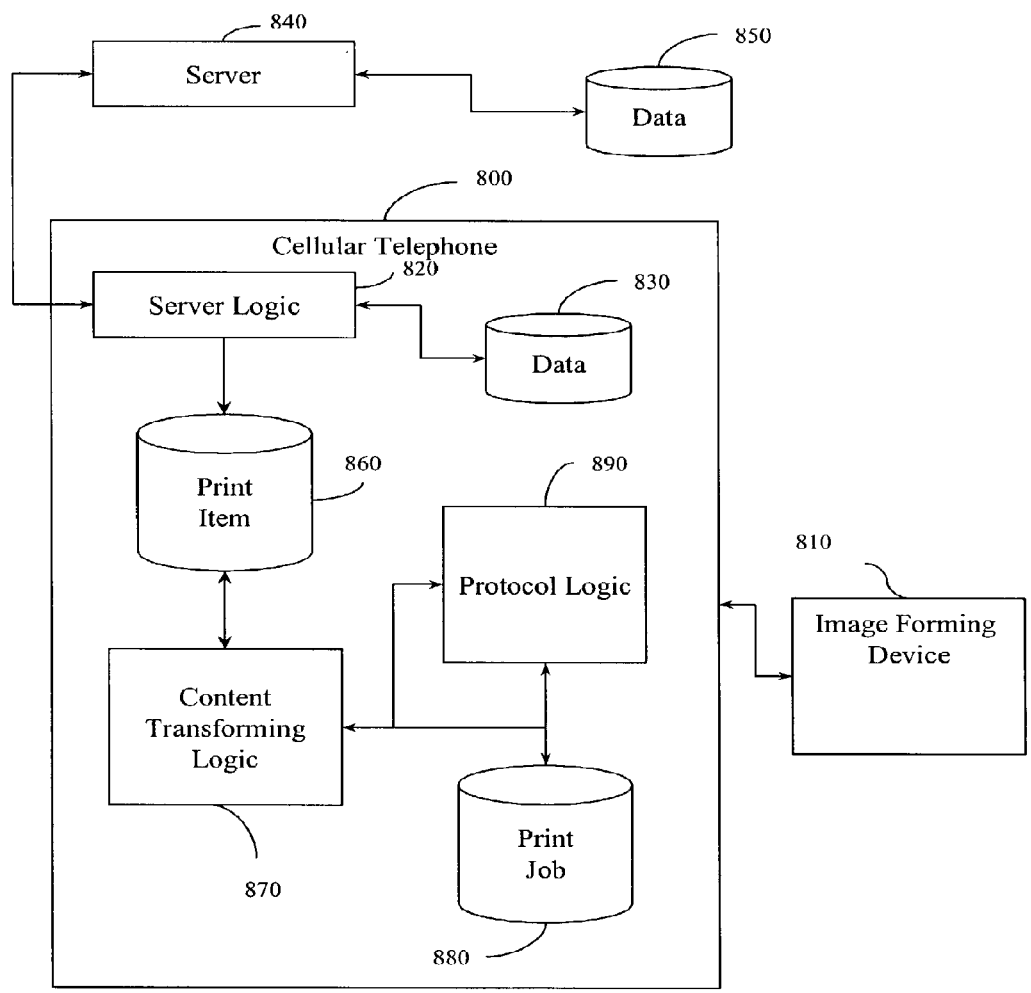
FIG. 8 illustrates an example cellular telephone protocol adaptive printing system.

FIG. 8 illustrates a cellular telephone 800 that can communicate with an image forming device 810 where the cellular telephone 800 is configured with a print system that includes a server logic 820. The server logic 820 can be configured to provide a print item 860 to a content transforming logic 870 using a protocol logic 890 for conversion into a print job 880. The server logic 820 may interact with, for example, a data store 830 on the cellular telephone 800 to retrieve an element(s) of a print item 860. Similarly, the server logic 820 may interact with a server 840 to retrieve a print item 860 or portions thereof. The print item 860, and/or a printable element associated with the print item 860 may be located in, for example, a data store 850 that the server 840 accesses at the request of the server logic 820. While a single server 840 and a single data store 850 are illustrated, it is to be appreciated that a greater number of servers 840 and data stores 850 may be accessed by the server logic 820.

In one example, the server logic 820 is configured to provide the print item 860 to the content transforming logic 870 by providing a print item identifier and a print item sub-element(s). The print item sub-elements may have of one or more print item sub-element types. For example, a print item sub-element may be text, an image in a first format (e.g., JPEG), an image in a second format (e.g., GIF), an audio element, and so on. When the server logic 820 provides a print item identifier (e.g., a print item header) to the content transforming logic 860, the content transforming logic 860 may determine to selectively acquire a sub-element. For example, the content transforming logic 860 may determine to acquire the text element and the JPEG element, but to not acquire the GIF element and the audio element. Thus, the server logic 820 can be configured to communicate with a server 840 to selectively retrieve a print item and/or a print item element. The server 840 may be, for example, an MMS server, an SMS server, a game server, a text server, an image server, a message server, a calendar server, a contact server, and the like.

Figure 9:
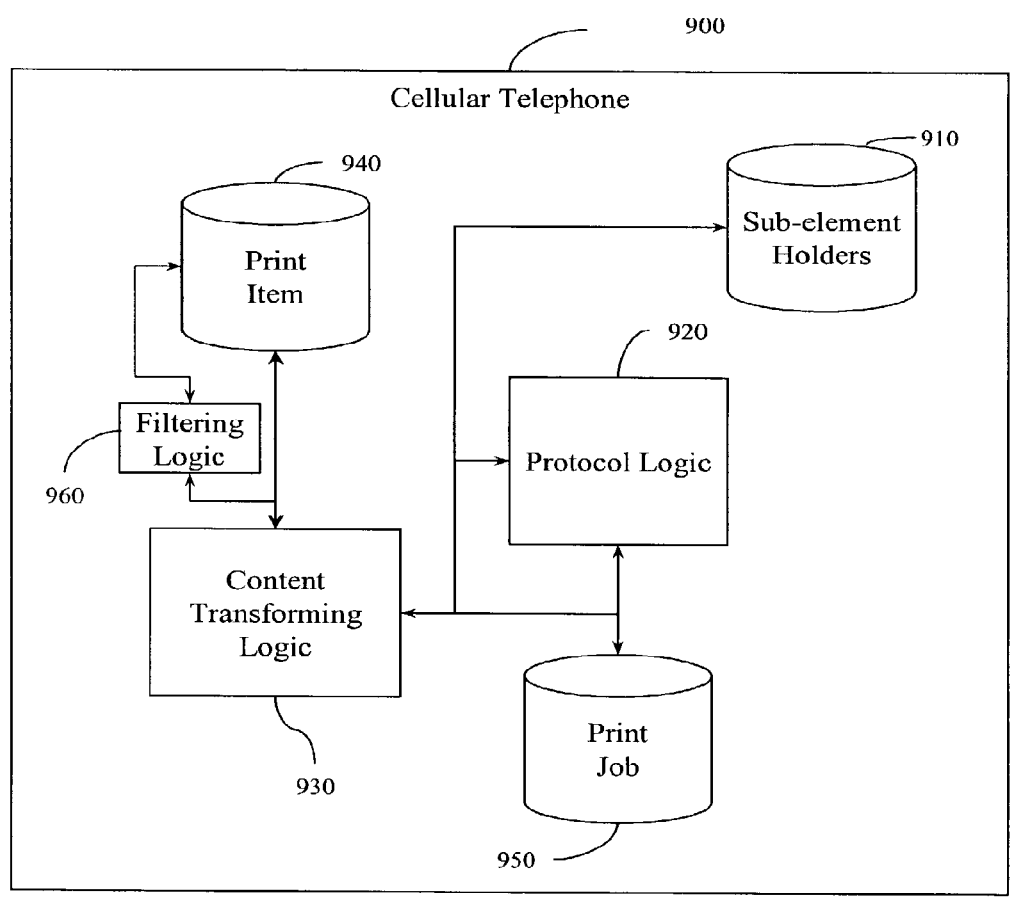
FIG. 9 illustrates an example cellular telephone protocol adaptive printing system.

FIG. 9 illustrates a cellular telephone 900 configured with a wireless protocol adaptive print system. The system includes a data store 910 that may store a sub-element holder. Which sub-element holders are stored in data store 910 and/or which sub-element holders are retrieved from data store 910 when processing print data on the cellular telephone 900 may depend on which cellular telephone print item transmission protocol(s) is supported by a protocol logic 920. The protocol logic 920 may be configured to process wireless data transmissions across a wireless communication link where the wireless data transmissions are formatted according to certain specifications. For example, the protocol logic 920 may be configured to support wireless data transmissions in accordance with a Bluetooth based network or an IEEE 802.11 based network. Similarly, the protocol logic 920 may be configured to transmit data written in languages like XHTML, XHTML-Print, WML (wireless markup language), XML (extensible markup language), HTML (hypertext markup language), and the like.

The system includes a content transforming logic 930 that may be configured to selectively process a print item 940 sub-element into a portion of a print job 950 based, at least in part, on whether the mobile device protocol logic 920 supports transmitting a print item sub-element type. For example, one implementation of Bluetooth BPP may support preparing a JPEG file for transmission over a Bluetooth based wireless network while another implementation of Bluetooth BPP may not support preparing a GIF file for transmission over a Bluetooth based wireless network.

The system can include data store 910 that stores a configurable print item sub-element holder. Thus, in one example, the content-transforming logic 930 may be configured to place a processed print item sub-element in a configurable print item sub-element holder. The configurable print item sub-element holder may be, for example, an XHTML template, an XHTML-Print template, and the like. But, there may be a variety of sub-element holders into which a print item sub-element may be placed. Thus, in one example, the protocol logic 920 is configured to select a print item sub-element holder into which the content-transforming logic will process a print item sub-element based, at least in part, on attributes including, but not limited to, the number of print item sub-elements to be processed, the type of print item sub-elements to be processed, the variety of types of print item sub-elements to be processed, and a print data transmission protocol supported by the protocol logic 920.

By way of illustration, the protocol logic 920 may determine that there is one print item sub-element to place in print job 950. This single print item sub-element may be a graphics file that includes a time stamp and a caption. Furthermore, the protocol logic 920 may determine that a cover sheet is appropriate for this type of graphic (e.g., secure information). Thus, the protocol logic 920 may select a sub-element holder from data store 910 based on the protocol that will be employed to transmit the print job 950 to an image forming device and the number and type of elements (e.g., single time stamped captioned image of secure data) in the print item. By way of further illustration, the protocol logic 920 may determine that there are four hundred print item sub-elements to place in print job 950. For example, a user may desire to print out their entire contacts file. Thus, the protocol logic 920 may select a modular sub-element holder from data store 910 that facilitates arranging multiple images and text on a single page, and that facilitates processing multiple instances of the page. Furthermore, the protocol logic 920 may select a sub-element holder or set of sub-element holders that facilitate first and last page treatments, headers and footers and the like.

It is to be appreciated that a configurable print item sub-element holder may support print functions including, but not limited to, positioning, centering, rotating, and scaling a print item sub-element. Similarly, it is to be appreciated that a configurable print item sub-element holder may support print functions including, but not limited to, a first page treatment functionality, a last page treatment functionality, a header functionality, a footer functionality, a page numbering functionality, a multiple image-per-page functionality, a functionality for combining a text print item sub-element or one or more image print item sub-elements, and a time stamping functionality for a print job.

The cellular telephone 900 may have applications or logics that have native data types. For example, a contact application may have a native data type for storing contacts. Similarly, a calendar application may have a native data type for storing calendar information. While a contact and a calendar application are described, it is to be appreciated that a cellular telephone 900 and/or wireless devices for which it may act as a print server may have other applications with other native data types. Thus, in one example, the content transforming logic 930 is configured to process a print item that includes a variable of a data type that is native to a cellular telephone 900. In another example, the content transforming logic 920 is configured to process data types that are native to the cellular telephone 900 and that are dynamically extensible.

As described above, various forms of filtering may be employed in a cellular telephone protocol adaptive print system. Thus, cellular telephone 900 may include a filtering logic 960 configured to perform one or more of the filtering operations described above.

Figure 10:
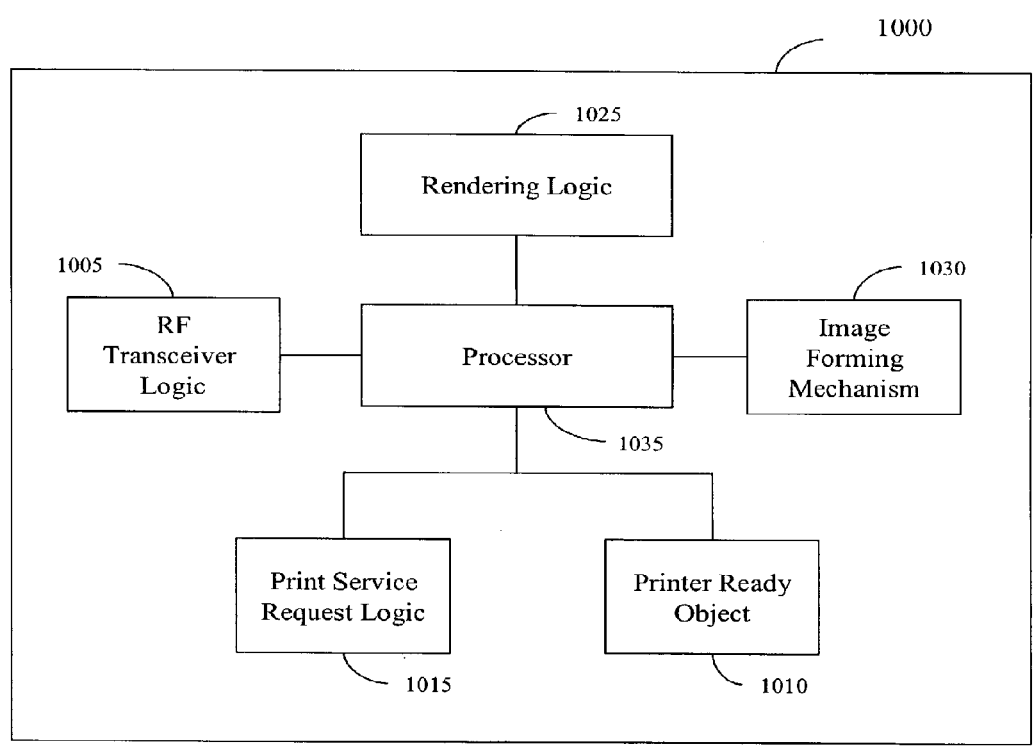
FIG. 10 illustrates an example image forming device that may interact with a system or method for cellular telephone protocol adaptive printing.

FIG. 10 illustrates an example image forming device 1000 that includes a compatible RF transceiver logic 1005. The image forming device 1000 may include a memory 1010 configured to store a printer-ready object received from a cellular telephone where the object was prepared to conform with a print data transmission protocol.

The image forming device 1000 may be configured to respond to queries from cellular telephones relating to print jobs. Therefore, the image forming device 1000 may include a print service request logic 1015 that, when the image forming device 1000 is queried, can transmit information about the object stored in memory 1010 and/or the processing thereof in response to the print service query. The print service request logic 1015 may also, periodically, or under image forming device 1000 control, transmit information about the object stored in memory 1010 and/or the processing thereof. The print service request logic 1015 may be implemented, for example, as a logic. The print service request logic 1015 may also be configured to initiate the transmission of the data to a cellular telephone without receiving a query, status request or print service request. For example, one or more elements of the information about a print job can be automatically transmitted based on predetermined triggering events like a time period elapsing, a processing event occurring, and/or other event occurring. In this manner, the image forming device 1000 can provide automatic status updates to cellular telephones that have a print job being processed. It will also be appreciated that the print service request logic 1015 can also be configured to monitor and provide state information and the like for print data associated with multiple cellular telephones.

Additionally, the image forming device 1000 may include rendering logic 1025 configured to generate a printer-ready image from a received non-printer-ready object received, for example, in an imaging request. Rendering varies based on the format of the data involved and the type of imaging device. In general, the rendering logic 1025 converts a high-level object-based description (e.g., the imaging request) into a graphical image for a display or printing (e.g., the print-ready image). For example, one form is ray-tracing that takes a mathematical model of a three-dimensional object or scene and converts it into a bitmap image. Another example is the process of converting HTML into an image for display/printing. In another example, the image forming device 1000 may not have a rendering logic 1025. In this case, a print job would be transmitted to the image forming device 1000 in a print-ready format.

The image forming device 1000 may also include an image forming mechanism 1030 configured to generate an image onto print media from the print-ready image. The image forming mechanism 1030 may vary based on the type of imaging device 1000 and may include a laser imaging mechanism, other toner-based imaging mechanisms, an ink jet mechanism, digital imaging mechanism, or other imaging reproduction engine. A processor 1035 may be included that is implemented with logic to control the operation of the image-forming device 1000. In one example, the processor 1035 includes logic that is capable of executing Java instructions. Other components of the image forming device 1000 are not described herein but may include media handling and storage mechanisms, sensors, controllers, and other components involved in the imaging process.

Figure 11:
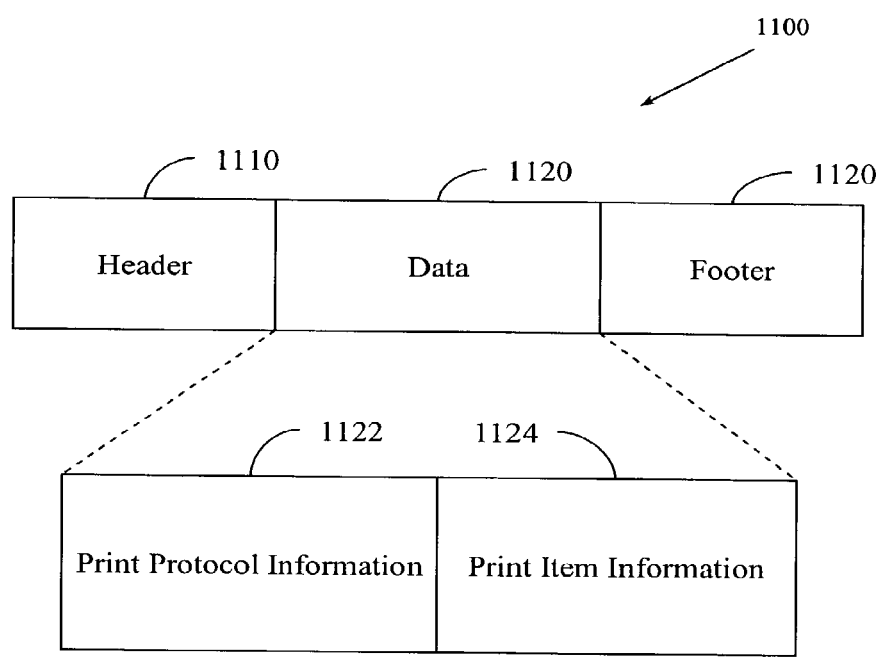
FIG. 11 illustrates an example data packet associated with systems and methods for cellular telephone protocol adaptive printing.

FIG. 11 illustrates an example data packet 1100 associated with systems and methods for cellular telephone protocol adaptive printing. Information can be transmitted between various logics and/or communication components associated with cellular telephone protocol adaptive printing via a packet like data packet 1100. Example data packet 1100 includes a header field 1110 where information like the length and type of data packet 1100 may be stored. The header field 1110 may also include, for example, a source identifier that identifies, for example, a network or other address of the source of the data packet 1100. The header field 1110 may also include, for example, a destination identifier that identifies, for example, a network or other address of the intended destination for the packet 1100. Thus, the header field 1110 may include, in one example, a cellular telephone address associated with a cellular telephone from which a print job originated and a network address of a printer to which the print job is to be delivered. It is to be appreciated that the source and destination identifiers may take forms including, but not limited to, globally unique identifiers (guids), uniform resource locations (URLs), path names, and so on. Other types and forms of information that can be included in the data packet 1100 that can depend on the communication protocol being employed.

The data field 1120 may include various information intended to be communicated between the source and destination. Example fields 1122 and 1124 are provided. By way of illustration, data associated with a cellular telephone protocol adaptive print system may be stored in field 1122. This data may supply information about the set of wireless network protocols and specifications, hardware configurations, software configurations, wireless network file formats, printer-ready instruction file formats, printer-ready instruction languages, and so on that form a print data transmission protocol that facilitate transmitting a print job between a cellular telephone and an image forming device. By way of illustration, the print protocol information stored in field 1122 may identify a Bluetooth standard associated with the protocol, an XHTML-Print version associated with the protocol, a Bluetooth BPP standard associated with the protocol and so on. Field 1124 may store, for example, print item information. The print item information may be, for example, a print item identifier, a print item, and so on.

Figure 12:
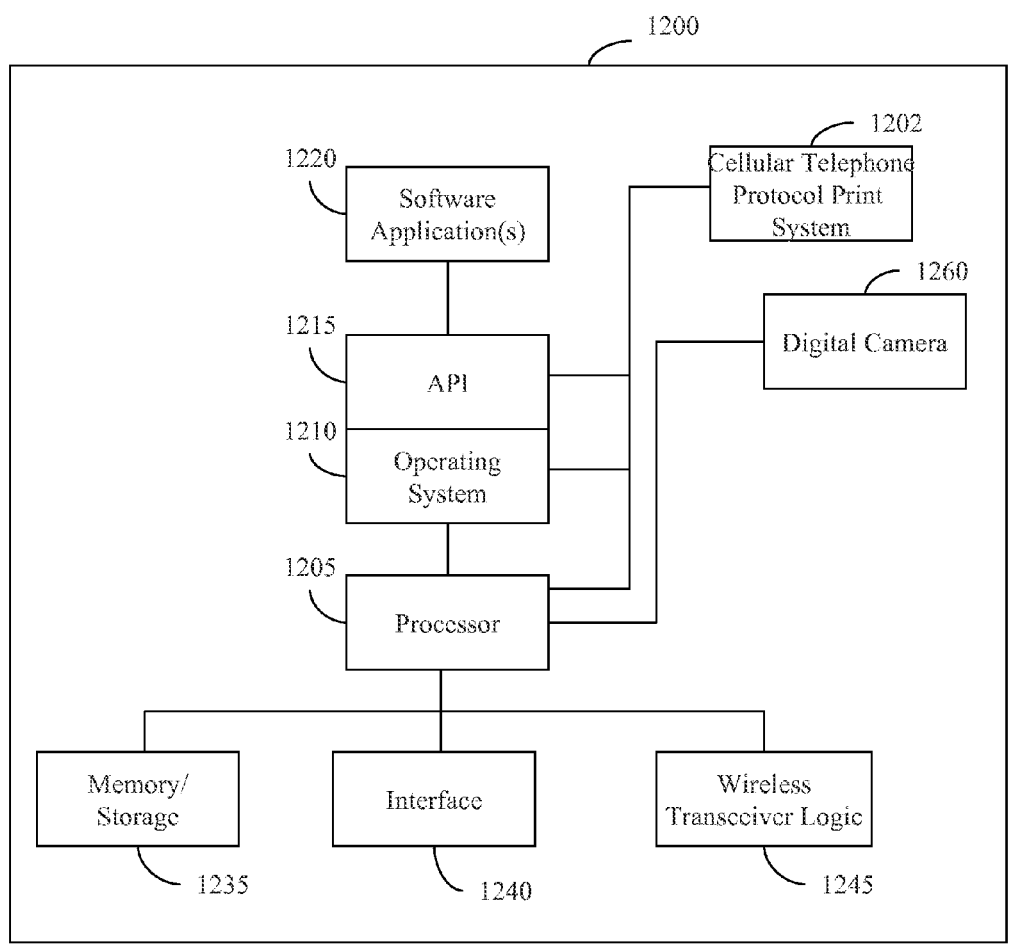
FIG. 12 illustrates an example cellular telephone configured with an example cellular telephone protocol adaptive print system.

FIG. 12 illustrates an example cellular telephone 1200 that includes a cellular telephone adaptive protocol print system 1202. In addition to the cellular telephone adaptive protocol print system 1202, the cellular telephone 1200 may include a processing system that has, for example, a processor 1205, an operating system 1210, and an application programming interface (API) 1215 to facilitate communications between one or more of, the software application 1220, the cellular telephone adaptive protocol print system 1202, and the operating system 1210. The processing system of the cellular telephone 1200 can be configured to execute a variety of software applications 1220.

Other components of the cellular telephone 1200 may include a memory and/or storage 1235 that can include a computer-readable medium. The storage 1235 may also include a port that accepts and reads data stored on a removable memory card or other removable computer-readable medium. An interface 1240 can include a display screen, one or more buttons, a pointing device, or other types of devices that can communicate data to a user and receive input from a user. To perform wireless communication, a wireless transceiver logic 1245 is provided. Depending on the wireless communication protocol desired, the transceiver logic 1245 can be configured according to different specifications.

In one example, the wireless protocol is Bluetooth based and the transceiver 1245 would include a Bluetooth radio and antenna. Other protocols include IEEE 802.11 and other available wireless protocols. In one example, the wireless transceiver logic 1245 includes a radio frequency transceiver configured to transmit and receive radio frequency signals. Infrared communication can also be employed. The transceiver logic 1245 may be, for example, a microchip in the cellular telephone 1200 or configured on a removable device like a PCMCIA card (PC card) that can be connected and disconnected to the cellular telephone 1200 via a connection port or slot. In one example, the cellular telephone 1200 includes a digital camera 1260. In this example, the cellular telephone 1200 may be referred to as a camera-enabled phone.

The systems, methods, objects and so on described herein may be stored, for example, on a computer-readable medium. An example computer-readable medium can store, for example, processor executable instructions for a cellular telephone protocol adaptive printing method that includes identifying a cellular telephone print item to print, where the cellular telephone print item includes printable elements, identifying a print data transmission protocol by which a print job can be transmitted from a cellular telephone to an image forming device via a wireless communication link, identifying, from printable elements, print job candidate elements that can be processed into a printer-ready format according to the print data transmission protocol, selectively processing print job candidate elements into print job elements formatted according to the print data transmission protocol, and processing print job elements into a print job. While the above method is described being stored on a computer-readable medium, it is to be appreciated that other methods described herein can also be stored on a computer-readable medium.

While the systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on employed in mobile communication device printing. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicants' general inventive concept. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" is employed in the detailed description or the claims, it is intended to be inclusive in a manner similar to the term "comprising" as that term is interpreted when employed as a transitional word in a claim. Furthermore, to the extent that the term "or" is employed in the claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

What is claimed is:

1. A cellular telephone protocol adaptive printing system, comprising:
    a cellular telephone including:
        a mobile device protocol logic configured to transmit a print job from the cellular telephone to an image forming device, pursuant to a print data transmission protocol;
        a content transforming logic configured to process a print item into the print job pursuant to the print data transmission protocol supported by the mobile device protocol logic;
        a filtering logic configured to filter elements of the print item into printable and non-printable elements; and
        a user interface configured to identify for a user of the cellular telephone the printable and non-printable elements.

2. The system of claim 1, further comprising:
    the image forming device including:
        a receiving protocol logic configured to receive a print job processed by the mobile device protocol logic.

3. The system of claim 2, where the image forming device further includes:
    a rendering logic configured to process the print job received by the receiving protocol logic into a printer-usable format.

4. The system of claim 3, where the rendering logic is configured to render the print job received by the receiving protocol logic into a bitmap.

5. The system of claim 1,
    where the user interface is configured to present information associated with one or more parameters associated with one or more of, the print item, the content transforming logic, the print job, and the mobile device protocol logic, the user interface further configured to receive one or more of, an indication, and a value associated with the one or more of, the print item, the content transforming logic, the print job, and the mobile device protocol logic.

6. The system of claim 1, comprising:
    a server logic configured to provide the print item to the content transforming logic.

7. The system of claim 6, where providing the print item to the content transforming logic comprises:
    providing a print item identifier; and
    providing one or more print item sub-elements of one or more print item sub-element types.

8. The system of claim 6, where the server logic is configured to communicate with a server to retrieve the print item.

9. The system of claim 8, where the server is one or more of, an MMS server, an SMS server, a game server, a text server, an image server, a message server, a calendar server, and a contact server.

10. The system of claim 7, where the content transforming logic is configured to selectively process a print item sub-element into a portion of the print job based, at least in part, on whether the mobile device protocol logic supports transmitting a print item sub-element type.

11. The system of claim 1, comprising:
    one or more configurable print item sub-element holders, and
    where the content-transforming logic is configured to place a processed print item sub-element in a configurable print item sub-element holder.

12. The system of claim 11, where the configurable print item sub-element holder is an XHTML template.

13. The system of claim 11, where the protocol logic is configured to select a print item sub-element holder into which the content-transforming logic will process a print item sub-element based, at least in part, on one or more of, the number of print item sub-elements to be processed, the type of print item sub-elements to be processed, the variety of types of print item sub-elements to be processed, and a print data transmission protocol supported by the protocol logic.

14. The system of claim 11, where a configurable print item sub-element holder facilitates one or more of, positioning, centering, rotating, and scaling a print item sub-element.

15. The system of claim 11, where a configurable print item sub-element holder facilitates providing one or more of, a first page treatment, a last page treatment, a header, a footer, a page numbering functionality, a multiple image-per-page functionality, a functionality for combining a text print item sub-element or one or more image print item sub-elements, and a time stamping functionality for a print job.

16. The system of claim 1, where the content transforming logic is configured to process a print item that includes one or more variables of one or more data types that are native to a cellular telephone.

17. The system of claim 16, where the data types that are native to the cellular telephone are dynamically extensible.

18. A cellular telephone protocol adaptive printing system, comprising:
mobile device protocol logic to transmit a print job from a cellular telephone to an image forming device, pursuant to a print data transmission protocol;
content transforming logic to process a print item into the print job pursuant to the print data transmission protocol supported by the mobile device protocol logic, where the print item comprises elements having different types of content;
filtering logic to filter the elements of the print item into printable elements and non-printable elements; and
a user interface including a display screen to identify for a user of the cellular telephone the printable elements and the non-printable elements.

19. A cellular telephone protocol adaptive printing system, comprising:
mobile device protocol logic of a cellular telephone to transmit a print job from the cellular telephone to an image forming device via a wireless communication link, pursuant to a print data transmission protocol;
content transforming logic of the cellular telephone to process a print item into the print job pursuant to the print data transmission protocol supported by the mobile device protocol logic, where the print item comprises a plurality of elements, and where two or more of the elements have different types of content;
filtering logic of the cellular telephone to filter the plurality of elements of the print item into one or more printable elements and one or more non-printable elements; and
a user interface of the cellular telephone to identify for a user of the cellular telephone the one or more printable elements and the one or more non-printable elements.

20. The system of claim 19, where the user interface comprises a display of the cellular telephone.

* * * * *